UNITED STATES PATENT OFFICE 2,462,237

STABILIZATION OF ORGANIC COMPOUNDS

Ralph B. Thompson and Joseph A. Chenicek, Riverside, Ill., assignors to Universal Oil Products Company, Chicago, Ill., a corporation of Delaware No Drawing. Application March 29, 1946,
Serial No. 658,207

5 Claims. (Cl. 44—75)

This invention relates to the stabilization of organic compounds which tend to deteriorate in storage or in use due to undesirable oxidation reactions.

Various organic compounds including motor fuel, mineral oil, lubricating oil, drying oil, rubber, animal and vegetable fats and oils, etc., are adversely affected by oxygen, with the resultant formation of undesirable gums and usually discoloration of the organic compound, as well as other deleterious reactions. This is particularly true of motor fuels comprising olefinic gasolines, such as cracked gasoline and polymer gasoline.

One object of the present invention is to prevent or at least substantially retard the undesirable deterioration of organic compounds. Another object of the invention is to provide a novel inhibitor which will function to stabilize organic compounds.

Various inhibitors heretofore have been proposed for this purpose, among which is benzyl aminophenol (B. A. P.). While B. A. P. is effective as an inhibitor, we have found unexpectedly improved results are obtained by modification in accordance with the teachings of the present invention.

In a broad aspect the present invention relates to a method of stabilizing an organic compound against deterioration by oxygen which comprises incorporating therein an N-(substituted benzyl)-p-aminophenol in a small but effective amount to retard said deterioration.

In one embodiment the present invention relates to a method of stabilizing cracked gasoline against deterioration by oxygen which comprises incorporating therein an N-(hydroxy benzyl)-p-aminophenol in an amount of less than 1% by weight.

In another specific embodiment the present invention relates to a method of stabilizing cracked gasoline against deterioration by oxygen which comprises incorporating therein an N-(p-aminobenzyl)-p-aminophenol in an amount of from about 0.0001% to about 0.01% by weight.

As hereinbefore set forth, we have found that N-(substituted benzyl)-p-aminophenols are of unexpectedly higher potency as inhibitors than B. A. P. For example, when used for the stabilization of Pennsylvania cracked gasoline, the addition of 0.005% by weight of B. A. P. resulted in an induction period of 465 minutes, whereas a similar amount of N-(p-hydroxy benzyl)-p-aminophenol, or of N-(p-aminobenzyl)-p-aminophenol when added to other samples of the same gasoline resulted in an induction period of 735 minutes. It is thus seen that the substituted benzyl compounds of the present invention exert an unexpectedly high improvement as compared to B. A. P.

The improved inhibitors of the present invention may be represented by the following formula:

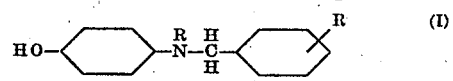

where R is selected from the group consisting of OH, OR', NH$_2$, NHR' and NR'R"; and R' is a hydrocarbon radical, and R" is selected from the group consisting of H and alkyl radicals.

When R of the above formula is a hydroxyl group it is preferred that one or more alkyl groups also be attached to the benzyl nucleus, as shown in the following formulas:

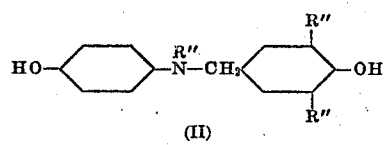

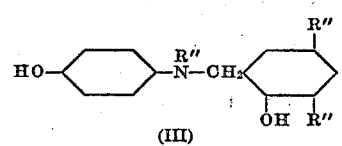

where R" is chosen from the group consisting of H and alkyl radicals.

Suitable compounds falling within this classification include N-(4-hydroxybenzyl)-p-aminophenol, N-methyl-N-(4-hydroxybenzyl)-p-aminophenol, N-(2-hydroxy-5-methylbenzyl)-p-aminophenol, N-(2-hydroxybenzyl)-p-aminophenol, N-(2-hydroxy-3,5-di-tert-butyl-benzyl)-p-aminophenol), N-(4-hydroxy-3,5-di-tert-butyl-benzyl)-p-aminophenol, N-methyl-N-(4-hydroxy-3-propyl-benzyl)-p-aminophenol, etc.

When the substituent group attached to the benzyl ring in formula I is an alkoxy or ether group represented by the formula OR', the inhibitor will comprise a N-(alkoxy-benzyl)-p-aminophenol and preferably is N-(p-alkoxy-benzyl)-p-aminophenol. Included in this classification of inhibitors are such compounds as N-(p-methoxy-benzyl)-p-aminophenol, N-(p-ethoxy-benzyl)-p-aminophenol, etc.

When the substituent group on the benzyl ring comprises a NH$_2$, NHR' or NR'R' radical, the inhibitor will comprise such compounds as N-(4-aminobenzyl)-p-aminophenol, N-(4-methyl-aminobenzyl)-p-aminophenol, N-(4-dimethylaminobenzyl) - p - aminophenol, N - (4 - ethyl-aminobenzyl) - p - aminophenol, N-(4 - diethyl-aminobenzyl) - p - aminophenol, N-(4 - methyl-ethyl-aminobenzyl) p-aminophenol, N-(4-methyl-propyl-aminobenzyl)-p-aminophenol, N-(4-di-propyl-aminobenzyl)-p-aminophenol, etc.

It is understood that the inhibitors specifically set forth are merely typical illustrations of suitable compounds which may be employed in accordance with the broad scope of the present invention. It is understood that the aminophenol ring may also contain substituent groups attached thereto and particularly hydrocarbon substituent groups.

It is understood that the numerous inhibitors which may be utilized in accordance with the present invention are not necessarily equivalent in their potency and other properties, and that the exact inhibitor to be utilized will depend upon the particular organic compounds to be treated.

The inhibitor of the present invention will usually be added to gasoline in an amount of less than 0.1% by weight and generally in an amount of from about 0.0001% by weight to about 0.01%. The exact amount required will depend upon the particular organic compound being treated and upon the potency of the specific inhibitor selected.

The following examples are introduced to illustrate further the novelty and utility of the present invention but not with the intention of unduly limiting the same.

The gasoline utilized in the following examples comprised a Pennsylvania cracked gasoline which had an induction period of about 100 minutes in the absence of an added inhibitor. Upon the addition of 0.005% by weight of B. A. P. the induction period of the gasoline was increased to about 465 minutes.

*Example I*

N-(4-hydroxybenzyl)-p-aminophenol was prepared by reacting p-hydroxy-benzaldehyde with p-aminophenol and reducing the resultant product with hydrogen in the presence of a nickel catalyst. When added in an amount of 0.005% by weight to a sample of the Pennsylvania cracked gasoline, the induction period thereof was 735 minutes, which is an increase of 270 minutes as compared to B. A. P.

*Example II*

N-(2-hydroxy-5-methylbenzyl)-p-aminophenol was prepared by reacting 2-hydroxy-5-methyl-benzaldehyde with p-aminophenol and reducing the resultant product with hydrogen in the presence of a nickel catalyst. When added to another sample of the Pennsylvania cracked gasoline, 0.005% by weight of N-(2-hydroxy-5-methyl-benzyl)-p-aminophenol increased the induction period of the gasoline to 745 minutes, which is an increase of 280 minutes as compared to B. A. P.

*Example III*

N-(4-aminobenzyl)-p-aminophenol was prepared by reacting aminophenol with p-nitro-benzyl bromide and reducing the resultant product with hydrogen in the presence of a nickel catalyst. When added to another sample of the Pennsylvania gasoline, 0.005% by weight of N-(4-aminobenzyl)-p-aminophenol raised the induction period of the gasoline to 735 minutes, which is an increase of 270 minutes over the improvement obtained by B. A. P.

We claim as our invention:

1. A cracked gasoline motor fuel tending to deteriorate in the presence of oxygen containing an inhibitor having the formula

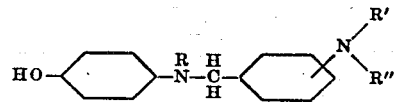

where R, R', and R'' are selected from the group consisting of H and alkyl radicals.

2. Cracked gasoline containing, as an inhibitor against oxidative deterioration, an N-(4-amino-benzyl)-p-aminophenol.

3. Cracked gasoline containing, as an inhibitor against oxidative deterioration, N-(4-amino-benzyl)-p-aminophenol in an amount of from about 0.0001% to about 0.01% by weight.

4. Cracked gasoline containing, as an inhibitor against oxidative deterioration, an N-(4-alkyl-aminobenzyl)-p-aminophenol.

5. Cracked gasoline containing, as an inhibitor against oxidative deterioration, an N-(4-dialkyl-aminobenzyl)-p-aminophenol.

RALPH B. THOMPSON.
JOSEPH A. CHENICEK.

REFERENCES CITED

The following references are of record in the file of this patent:

UNITED STATES PATENTS

| Number | Name | Date |
| --- | --- | --- |
| 2,063,151 | Dahlen | Dec. 8, 1936 |